US008527650B2

(12) United States Patent
Craft et al.

(10) Patent No.: US 8,527,650 B2
(45) Date of Patent: Sep. 3, 2013

(54) CREATING A CHECKPOINT FOR MODULES ON A COMMUNICATIONS STREAM

(75) Inventors: David Jones Craft, Austin, TX (US); Ranadip Das, West Bengal (IN); Rajeev Mishra, Karnataka (IN); Lance Warren Russell, Rosanky, TX (US)

(73) Assignee: International Business Machines Corporation, Armonk, NY (US)

( * ) Notice: Subject to any disclaimer, the term of this patent is extended or adjusted under 35 U.S.C. 154(b) by 546 days.

(21) Appl. No.: 11/751,482

(22) Filed: May 21, 2007

(65) Prior Publication Data
US 2008/0294787 A1 Nov. 27, 2008

(51) Int. Cl.
*G06F 15/173* (2006.01)

(52) U.S. Cl.
USPC .......................... 709/232; 709/220; 709/223

(58) Field of Classification Search
None
See application file for complete search history.

(56) References Cited

U.S. PATENT DOCUMENTS

| | | | |
|---|---|---|---|
| 5,539,885 A | 7/1996 | Ono et al. | |
| 5,724,512 A | 3/1998 | Wineerbottom | |
| 5,884,021 A * | 3/1999 | Hirayama et al. | 714/13 |
| 6,795,966 B1 * | 9/2004 | Lim et al. | 718/1 |
| 6,834,358 B2 | 12/2004 | Korenevsky et al. | |
| 6,963,923 B1 | 11/2005 | Bennett | |
| 7,024,467 B2 | 4/2006 | Rosensteel, Jr. et al. | |
| 7,039,663 B1 | 5/2006 | Federwisch et al. | |
| 7,076,555 B1 | 7/2006 | Orman et al. | |
| 7,082,551 B2 | 7/2006 | Lawrance et al. | |
| 7,099,866 B1 | 8/2006 | Crosbie et al. | |
| 7,272,654 B1 | 9/2007 | Brendel | |
| 7,373,468 B1 | 5/2008 | Gupta | |
| 7,437,606 B2 | 10/2008 | Janakiraman et al. | |
| 7,505,410 B2 | 3/2009 | Lakshmanamurthy et al. | |
| 7,577,720 B2 | 8/2009 | Vertes et al. | |
| 7,577,834 B1 | 8/2009 | Traversat et al. | |

(Continued)

FOREIGN PATENT DOCUMENTS

| | | |
|---|---|---|
| FR | 2843210 | 6/2004 |
| FR | 2872605 | 6/2004 |
| WO | WO2004015513 | 2/2004 |
| WO | WO2006010812 | 2/2006 |

OTHER PUBLICATIONS

"A Checkpoint and Restart mechanism for parallel programming systems—Messages and Queues", Sameer Paranjpye, pp. 1-4, retrieved May 14, 2007 http://charm.cs.uiuc.edu/papers/SameerThesis.www/node13.html.

(Continued)

*Primary Examiner* — Azizul Choudhury
(74) *Attorney, Agent, or Firm* — Yee & Associates, P.C.

(57) ABSTRACT

A computer implemented method, computer program product, and system for creating a checkpoint of a stream. A stream checkpoint request to create the checkpoint of the stream is received, wherein the stream is used by a process as a communications path, and wherein the communications path is modified by a set of modules. In response to identifying the identity of each module in the set of modules, the identity of each module in the set of modules is stored in the checkpoint. In response to identifying an order of the set of modules, the order of the set of modules is stored in the checkpoint. In response to sending a stream checkpoint message to each module in the set of modules, module data is received from each module in the set of modules to form received module data. The received module data is stored in the checkpoint.

20 Claims, 13 Drawing Sheets

(56) References Cited

U.S. PATENT DOCUMENTS

| | | | |
|---|---|---|---|
| 7,653,833 B1* | 1/2010 | Miller et al. ............ 714/13 |
| 7,681,235 B2 | 3/2010 | Chesla et al. |
| 7,769,717 B2 | 8/2010 | Federwisch et al. |
| 7,792,983 B2 | 9/2010 | Mishra et al. |
| 7,930,327 B2 | 4/2011 | Craft et al. |
| 7,950,019 B2 | 5/2011 | Craft et al. |
| 2002/0174379 A1* | 11/2002 | Korenevsky et al. ............ 714/19 |
| 2004/0250124 A1* | 12/2004 | Chesla et al. ................. 713/201 |
| 2005/0021745 A1* | 1/2005 | Bookman et al. ............. 709/224 |
| 2005/0262411 A1 | 11/2005 | Vertes et al. |
| 2005/0276548 A1* | 12/2005 | Fu et al. ............ 385/95 |
| 2006/0041786 A1 | 2/2006 | Janakiraman et al. |
| 2006/0184587 A1 | 8/2006 | Federwisch et al. |
| 2007/0088702 A1 | 4/2007 | Fridella et al. |
| 2007/0244962 A1 | 10/2007 | Laadan et al. |
| 2008/0294703 A1 | 11/2008 | Craft et al. |
| 2008/0295111 A1 | 11/2008 | Craft et al. |
| 2009/0037550 A1 | 2/2009 | Mishra et al. |

OTHER PUBLICATIONS

"Solaris Internals: Solaris 10 and OpenSolaris Kernel Architecture", Second Edition, retrieved Mar. 20, 2007. http://safari5.bvdep.com/0131482092/ch14lev1sec9.
"The Single UNIX Specification, Version 2, 1997", The Open Group, retrieved Mar. 20, 2007 http://opengroup.org/onlinepubs/007908799/xsh/fchdir.html
"Linux/Unix Information about the Linux/Unix chdir command" retrieved Mar. 20, 2007 http://www.computerhope.com/unix/uchdir.htm.
Hutzelman, "[OpenAFS]MailDir & Coda/AFS was: Practical no. of files per dir was: [OpenAFS] Max number of files in volume?", retrieved Mar. 20, 2007 http://www.openafs.org/pipermail/openafs-info/2004-May/013499.html.
Ryakov, "filesystem implementation questions", retrieved Mar. 20, 2007 http://lists.freebsd.org/pipermail/freebsd-hackers/2005-Aug./013133.html.
Krishnan et al., "Checkpoint and Restart for Distributed Components in XCAT3", Proceedings of the Fifth IEEE/ACM International Workshop on Grid Computing (GRID'04), 2004, pp. 281-288.
Sancho et al., "Current Practice and a Direction Forward in Checkpoint/Restart Implementations for Fault Tolerance", Proceedings of the 19th IEEE International Parallel and Distributed Processing Symposium (IPDPS'05), Workshop 18, vol. 19, 2005, pp. 1-8.
Zhong et al., "CRAK: Linux Checkpoint/Restart As a Kernel Module", Network Computing Lab, Columbia University, Technical Report CUCS-014-01, Nov. 2001, pp. 1-19 http://www.ncl.cs.columbia.edu/research/migrate/crak.html.
Office Action, dated May 14, 2009, regarding U.S. Appl. No. 11/751,455, 28 pages.
Final Office Action, dated Jan. 7, 2010, regarding U.S. Appl. No. 11/751,455, 22 pages.
Final Office Action, dated Jul. 1, 2010, regarding U.S. Appl. No. 11/751,455, 24 pages.
Notice of Allowance, dated Dec. 13, 2010, regarding U.S. Appl. No. 11/751,455, 7 pages.
Notice of Allowance, dated Jan. 20, 2011, regarding U.S. Appl. No. 11/751,505, 16 pages.
Office Action, dated Dec. 1, 2009, regarding U.S. Appl. No. 11/831,678, 16 pages.
Notice of Allowance, dated May 6, 2010, regarding U.S. Appl. No. 11/831,678, 11 pages.
USPTO Office action for U.S. Appl. No. 11/751,505 dated Aug. 19, 2010.

* cited by examiner

CREATING A CHECKPOINT FOR MODULES ON A COMMUNICATIONS STREAM

This invention was made with United States Government support under Agreement No. HR0011-07-9-0002 awarded by Defense Advanced Research Projects Agency (DARPA). The Government has certain rights in this invention.

BACKGROUND OF THE INVENTION

1. Field of the Invention

The present invention relates generally to data processing systems and in particular to software processes. Still more particularly, the present invention relates to a computer implemented method, apparatus, and computer program code for creating a checkpoint for modules on a communications stream in a software partitioned environment.

2. Description of the Related Art

A software partition includes a set of processes and a set of states associated with the set of processes. It is useful to create a software partition for the software processes, and move the software partition having the processes from one server to another server. Moving a software partition involves creating a checkpoint containing the state of each process in the set of processes, and the state of every activity undertaken by each process.

Currently, when a process in a software partition has established a connection over a network, such as a connection to a process on another server, the connection cannot be moved along with the software partition. Thus, when moving a software partition, any process which has a connection established loses the connection when the software partition is copied from one server to another server. Losing a connection when moving the software partition results in disruption of the activities undertaken by a process using the connection because the process must re-establish the connection, and then resume the activity using the connection.

SUMMARY OF THE INVENTION

The illustrative embodiments described herein provide a computer implemented method, computer program product, and system for creating a checkpoint of a stream. A stream checkpoint request to create the checkpoint of the stream is received, wherein the stream is used by a process as a communications path, and wherein the communications path is modified by a set of modules. Responsive to identifying the identity of each module in the set of modules, the identity of each module in the set of modules is stored in the checkpoint. Responsive to identifying an order of the set of modules, the order of the set of modules is stored in the checkpoint. Responsive to sending a stream checkpoint message to each module in the set of modules, module data is received from each module in the set of modules to form received module data. The received module data is stored in the checkpoint.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
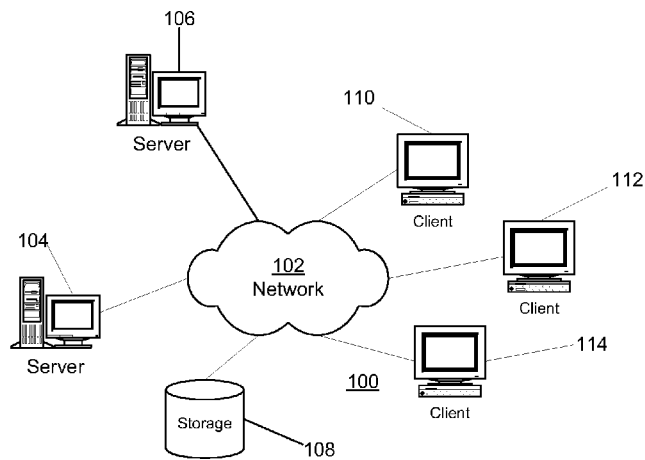
FIG. 1 depicts a pictorial representation of a network of data processing systems in accordance with an illustrative embodiment.
Figure 2:
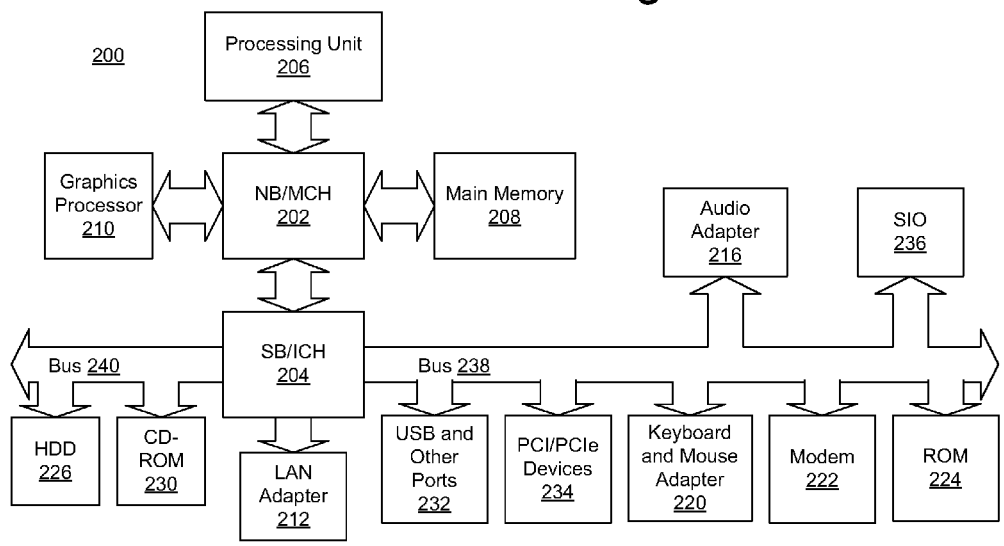
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including a north bridge and memory controller hub (NB/MCH) 202 and a south bridge and input/output (I/O) controller hub (SB/ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the NB/MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238, and hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java™ programs or applications executing on data processing system 200. Java™ and all Java™-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

A software partition includes a set of processes and a set of states associated with the set of processes. A set comprises one or more elements, so that the set of processes contains one or more processes, and the set of states contains one or more states. When a server, such as server 104, runs one or more software processes, it is useful to create a software partition for the software processes, and copy the software partition having the processes from one server to another server. The server where the software partition is taken from is called the departure server, and the server receiving the software partition is called the arrival server.

Moving a software partition involves creating a checkpoint containing the state of each process in the set of processes, and the state of every activity undertaken by each process. The checkpoint is created by freezing each process in the software partition, and gathering information for each process while each process is frozen. A process is frozen by temporarily stopping the execution of the process. Freezing each process prior to creating the checkpoint ensures that the state of each process is not modified when the checkpoint is created. Thus, moving the software partition involves freezing the processes on the departure server, creating a checkpoint, moving the software partition to the arrival server, and restarting the frozen processes on the arrival server. Restarting a frozen process involves restoring the state of the process using the checkpoint data. Restarting a frozen process is also known as unfreezing the process.

Figure 3:
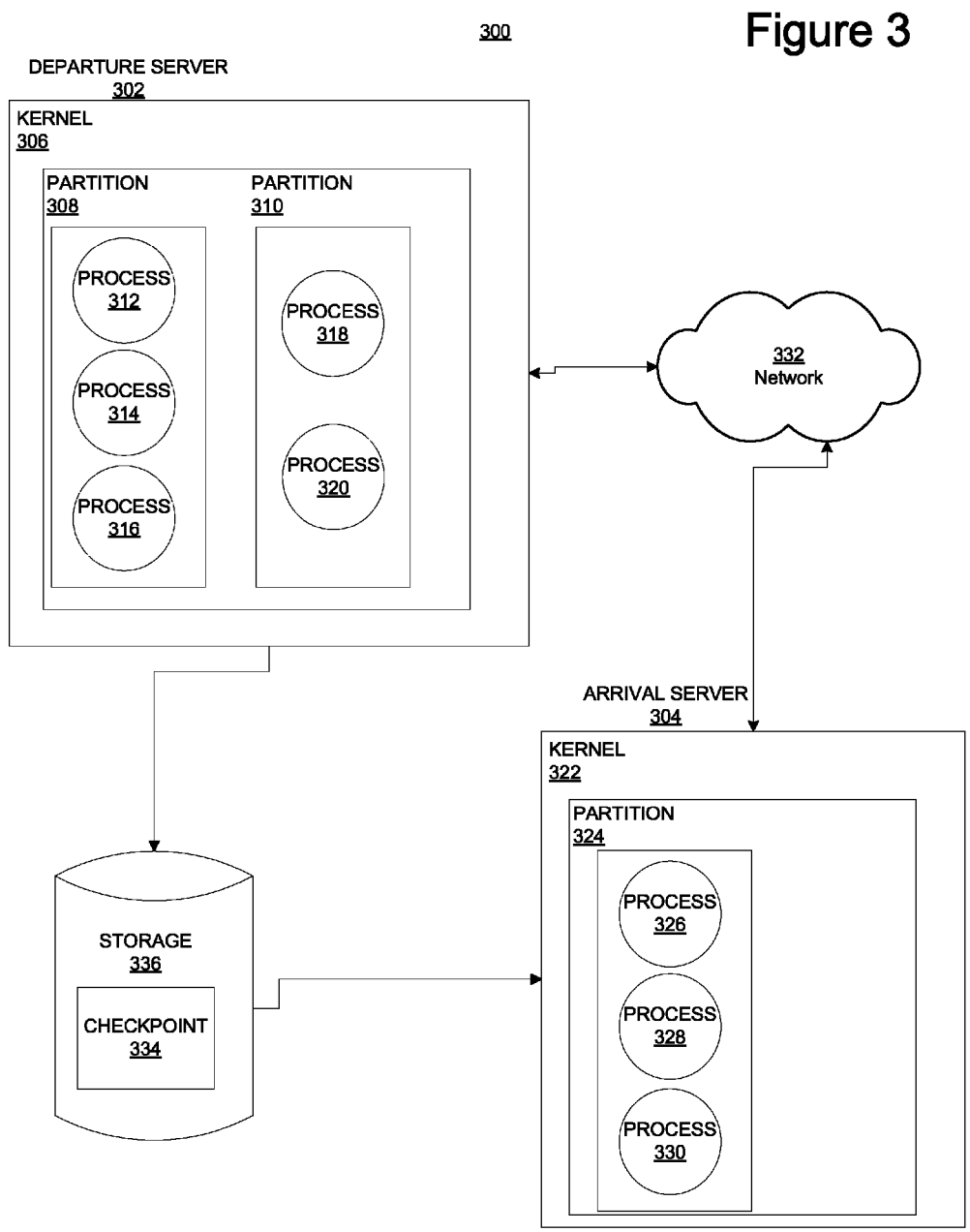
FIG. 3 is a block diagram of a data processing system in accordance with an illustrative embodiment.

FIG. 3 is a block diagram of a data processing system in accordance with an illustrative embodiment. Data processing system 300 is a data processing system, such as, without limitation, data processing system 100 in FIG. 1. Data processing system 300 contains departure server 302, and arrival server 304. Departure server 302 and arrival server 304 may be implemented in any type of server, such as server 104 in FIG. 1.

Departure server 302 contains kernel 306. Kernel 306 contains one or more software partitions. In this example, kernel 306 contains partition 308, and partition 310. Partition 308 is a software partition containing one or more processes. In this example, partition 308 contains processes 312, 314, and 316, and partition 310 contains processes 318, and 320. Arrival server 304 contains kernel 322. Kernel 322 contains partition 324. Partition 324 contains processes 326, 328, and 330. The number of partitions shown in kernel 306, and kernel 322 are purely for the purpose of illustration. Similarly, the number of processes shown in partitions 308, 310, and 324 are purely for the purposes of illustration.

To move partition 308 from departure server 302 to arrival server 304, checkpoint 334 is created. Checkpoint 334 may be stored on a storage device, such as storage 336. Storage 336 may be main memory, such as main memory 208 in FIG. 2, or a hard disk drive, such as HDD 226. If storage 336 is main memory, checkpoint 334 is stored in main memory and transmitted directly from the departure server to the arrival server, without storing checkpoint 334 on a hard disk drive.

Checkpoint 334 contains checkpoint data. The checkpoint data in checkpoint 334 is one or more files containing the information needed to move software partition 308 from departure server 302 to arrival server 304. To move partition 308, processes 312-316 in partition 308 are frozen, checkpoint 334 is created, partition 308 is moved from departure server 302 to arrival server 304, and processes 312-316 in partition 308 are restarted on arrival server 304.

Processes on departure server 302, such as processes 312-316 in partition 308, communicate with external hardware and software through network 332. Network 332 is a network, such as network 102 in FIG. 1. When a process in partition 308 has created a network connection with an external hardware or software entity using network 332, the illustrative embodiments recognize that it would be useful to create checkpoint 334 with checkpoint data for the network connection. The illustrative embodiments recognize that checkpoint data for the network connection allows a user to move partition 308 from departure server 302 to arrival server 304 without significantly impacting processes 312-316 in partition 308. The illustrative embodiments recognize the difficulty in determining the data to collect for a network connection, and the difficulty in restoring the network connection using the data to preserve the connection state when moving a software partition from departure server to an arrival server. The illustrative embodiments recognize that creating a checkpoint for a network connection is particularly difficult for complex protocols such as, for example, transport layer interface (TLI), and extended transport interface (XTI). The illustrative embodiments recognize that creating a checkpoint for a network connection used by a process allows the process to be moved from one server to another server without noticeable disruption to the process.

The illustrative embodiments described herein provide a computer implemented method, computer program product, and system for creating a checkpoint of a stream. A stream checkpoint request to create the checkpoint of the stream is received, wherein the stream is used by a process as a communications path, and wherein the communications path is modified by a set of modules. The set of modules is one or more modules. Responsive to identifying the identity of each module in the set of modules, the identity of each module in the set of modules is stored in the checkpoint. Responsive to identifying an order of the set of modules, the order of the set of modules is stored in the checkpoint. Responsive to sending a stream checkpoint message to each module in the set of modules, module data is received from each module in the set of modules to form received module data. The received module data is stored in the checkpoint.

A module is a software entity which performs a basic function in a computer. For example, a module may receive two numbers, add the two numbers, and output the sum of the two numbers. Another module may receive data from one location and store the data in another location. Modules can be stacked. Modules are stacked by pushing two or more modules together in a specific order, so that the output of one module is received by the input of the next module. When data is fed into the input of the first module in the stack, the first module receives the data, performs a specific function to modify the data, and then sends the modified data to the next module in the stack. Similarly, each module in the stack receives the data, modifies the data, and sends the modified data to the next module.

Figure 4:
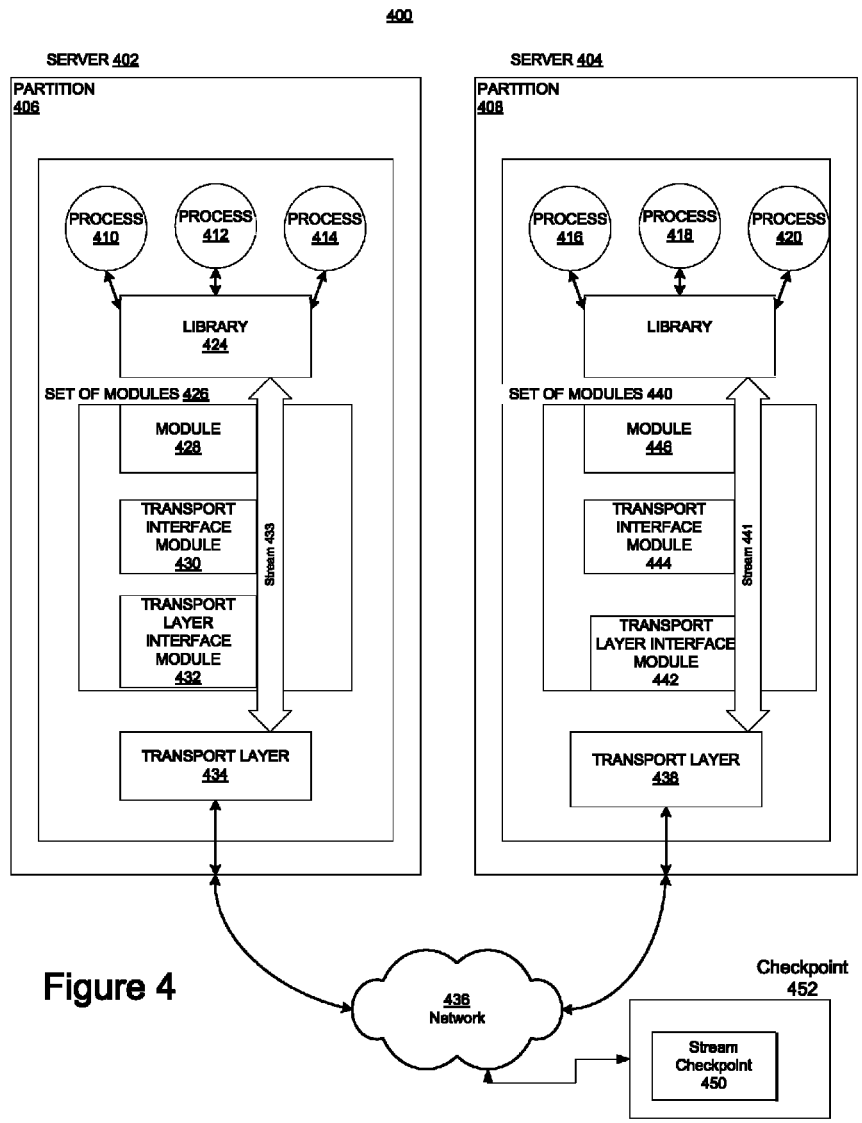
FIG. 4 is a block diagram of a network connection in accordance with an illustrative embodiment.

FIG. 4 is a block diagram of a network connection in accordance with an illustrative embodiment. Network connection 400 illustrates the components of a network connection between server 402, and server 404. Server 402 contains a software partition, partition 406. Server 404 contains partition 408. Partition 406 contains process 410, 412, and 414. Partition 408 contains processes 416, 418, and 420. Processes 410-420 are software processes, such as processes 312-320 in FIG. 3.

In this example, assume process 410 on partition 406 wants to communicate with process 416 on partition 408. To create a network connection between server 402, and server 404, process 410 uses a software procedure in library 424. Library 424 contains software procedures for performing input/output operations, such as "get", to retrieve data, and "put", to store data. For example, library 424 may contain software procedures for performing input/output operations which use at least one of transport layer interface (TLI), and extended transport interface (XTI). The software procedures in library 424 use set of modules 426.

Set of modules 426 implements host layers in the Open Systems Interconnection (OSI) standard. The Open Systems Interconnection (OSI) standard is a layered approach to network communications which uses seven layers for network communications. Each layer is isolated from all other layers, allowing one layer to request an input/output operation without having to know the details of how the other layer actually performs the input/output operation. For example, an application on one server can communicate with another application on another server without either application aware of the actual protocol used to transport communication messages between the applications.

Set of modules 426 contains module 428, transport interface module 430, and transport layer interface module 432. Module 428 is stacked on top of transport interface module 430, and transport interface module 430 is stacked on top of transport layer interface module 432. In this example, only one module, module 428, is shown above transport interface module 430. However, module 428 may be comprised of two or more modules, where the two or more modules are stacked on top of each other.

When process 410 calls a software procedure in library 424, the software procedure calls the top module in set of modules 426. In this example, the top of the module stack in the set of modules is module 428. Module 428 calls transport interface module (TIMod) 430. Transport interface module 430 is a gateway between process 410, and the protocol used in the network connection. For example, transport interface module 430 may implement a STREAMS module in a Unix-based operating system, such as, for example, AIX® from International Business Machines.

Transport interface module 430 converts input/output control (IOCTL) messages sent by a software procedure in library 424 into transport protocol messages using transport layer interface module 432. Transport layer interface module 432 converts messages into one or more specific transport protocols, such as, for example, transport layer interface (TLI), and extended transport interface (XTI). Transport layer interface module 432 may be an XTISO driver (XTI over sockets), a STREAMS-based driver in Unix-based operating systems which provides a Transport Layer Interface (TLI) to socket-based protocols such as transport layer interface (TLI), and extended transport interface (XTI).

Set of modules 426 contain a stream of messages along the communication path between the modules. This stream of messages is depicted as stream 433. Stream 433 is used by process 410 as a communications path to transport layer 434. Stream 433 is modified by each module in set of modules 426. Each module in set of modules 426 analyzes the data in stream 433 and modifies the data in stream 433 for the next module in the stream. For example, when data is being sent from process 410 to process 416, transport interface module 430 modifies stream 433 so that transport layer interface module 432 understands the contents of the stream.

Similarly, transport layer interface module 432 understands the protocol used by transport layer 434, and modifies stream 433 for the method of transport used by network 436. Transport layer 434 implements the transport layer of the seven layer Open Systems Interconnection (OSI) standard, using a protocol such as transmission control protocol (TCP). Network 436 transports messages from process 410 on server 402 to process 416 on server 404, and from process 416 back to the process 410. When server 404 receives a message from process 410 via network 436, transport layer 438 receives the message. Transport layer 438 is a transport layer, like transport layer 434, and implements the transport layer of the seven layer Open Systems Interconnection (OSI) standard. Transport layer 438 passes the message to set of modules 440.

Set of modules 440 is a set of modules containing a stream, such as set of modules 426. Set of modules 440 contains transport layer interface module 442, transport interface module 444, and module 446. Library 448 contains software procedures used by processes 416-420 to communicate with other processes.

Transport layer 438 passes messages received from process 410 via network 436 to set of modules 440. Each module in set of modules 440 modifies stream 441. For example, when transport layer interface module 442 receives a message from transport layer 438, transport layer interface module 442 modifies the message for transport interface module 444 and passes the message along stream 441 between the modules in set of modules 440. The message is then passed from stream 441 to a software procedure in library 448 called by a process, such as process 416.

When a process, such as process 410, calls a software procedure in library 424, the software procedure may be a blocking input/output operation. A blocking input/output operation is an input/output operation in which process 410 performs the input/output operation, and then waits for a response. When process 410 calls a blocking input/output operation, process 410 has two options. Process 410 can halt further execution and wait for a response, wherein process 410 is in a sleep state. Alternately, process 410 can continue executing, and periodically check to see a response has been received. Thus, when a checkpoint of a network connection used by a process is created, the process may be in a sleep state, or in an active state.

When process 410 is waiting for a response to the blocking input/output operation, process 410 may be in a sleep state. If process 410 is in a sleep state, process 410 is not executing, because process 410 is waiting for the response. Once the response arrives, process 410 wakes up, and continues executing. So the checkpoint must preserve the state of a process in a sleep state when the process is moved to another server so that the process is unaware the move occurred. Each process in the partition is modified so that each process can be interrupted when the process is in a sleep state. When a checkpoint for a stream is created, the checkpoint process determines whether the process using the stream is in a sleep state. In this example, if process 410 is using the stream in set of modules 426, and process 410 is in a sleep state, then process 410 is interrupted. After process 410 is interrupted, information about process 410 is gathered, and the information is stored in stream checkpoint 450. Stream checkpoint 450 is a checkpoint for stream 433, and set of modules 426. Stream checkpoint is part of checkpoint 452. Checkpoint 452 is a checkpoint, such as checkpoint 334 in FIG. 3.

The processes in the software partition, including the interrupted process, are frozen, and moved from the departure server to the arrival server. In this example, assume processes 410-414 are frozen, and moved from server 402 to server 404. When the stream from the departure server is restored on the arrival server, a determination is made whether frozen processes 410-414 has an interrupted process. In this example, a determination is made that process 410 is an interrupted process. The information about the interrupted process, process 410, was previously stored in stream checkpoint 450. After the stream used by process 410 is restarted, the information about process 410 in stream checkpoint 450 is used to place process 410 back in a sleep state on the arrival server. Process 410 resumes waiting for a response, unaware that process 410 was moved from the departure server to the arrival server.

Figure 5:
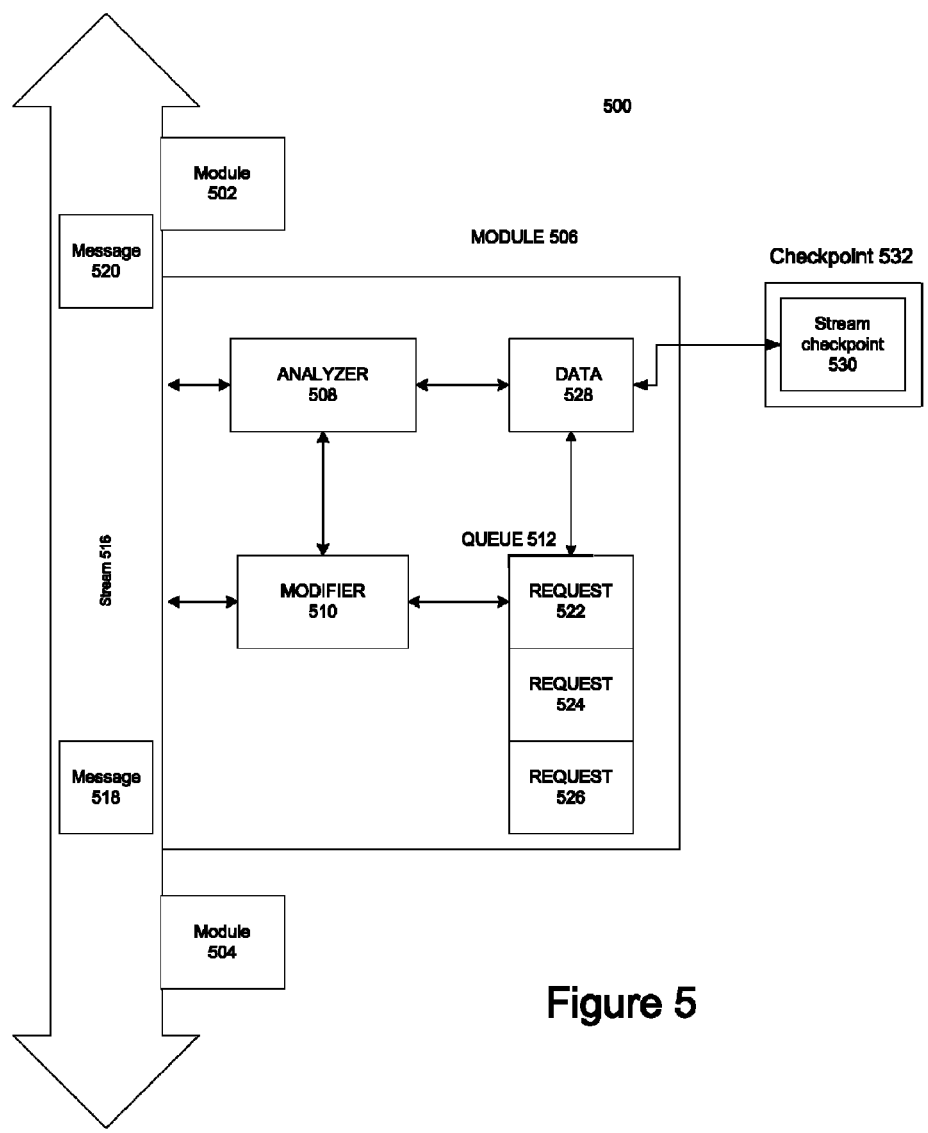
FIG. 5 is a block diagram of a set of modules in accordance with an illustrative embodiment.

FIG. 5 is a block diagram of a set of modules in accordance with an illustrative embodiment. In block diagram of a set of modules 500, modules 502, 504, and 506 are a set of modules, such as set of modules 426 in FIG. 4. Modules 502-506 are stacked on stream 516 to allow modules 502-506 to modify messages in stream 516 by pushing each one of modules 502-506 on to stream 516. Modules are pushed on to a stream in a specific order. A module is removed from acting on the stream by popping the module off the stream. Popping a module off the stream removes the module from acting on the messages in the stream.

In this example, module 506 contains analyzer 508, modifier 510, and queue 512. Those versed in the art will appreciate that module 506 may have additional components instead of, or in addition to the analyzer 508, modifier 510, and queue 512.

Modules 502-506 pass messages back and forth between each module using stream 516. Stream 516 carries messages between a set of modules, such as set of modules 426 in FIG. 4. In this example, stream 516 carries messages 518-520 between modules 502-506. When module 502 sends message 520 using stream 516 to module 506, analyzer 508 analyzes message 520. Based on the analysis of message 520, modifier 510 modifies message 520. The modified message is then sent on to the next module, module 504, using stream 516. Modifier 510 modifies message 520 so that the next module, module 504, understands what to do with message 520.

In module 506, queue 512 contains requests 522, 524, and 526. In FIG. 5, queue 512 is shown with three requests for the purpose of illustrations. Those versed in the art will appreciate that queue 512 is dynamic, and the number of requests changes from zero to one or more requests. Requests 522-526 may be requests from another module, such as module 502, or from a kernel, such as kernel 302 in FIG. 3. Requests 522-526 are sent to a module, such as module 506, using stream 516.

A checkpoint of a stream contains a snapshot of the contents of the stream, and a snapshot of the state and contents of each module on the stream. To create a checkpoint of a stream, such as stream 516, two special messages are defined, a stream checkpoint message, and a stream restart message. The stream checkpoint message and the stream restart message are messages, such as message 518-520. Typically, each module in the set of modules 502-506 is modified so that each module is aware of the stream checkpoint message, and the stream restart message. A module is said to be aware of the stream checkpoint message, and the stream restart message, when the module can recognize both messages, and can perform actions in response to receiving the stream checkpoint message, and the stream restart message.

The state and contents of each module on the stream are captured for the stream checkpoint by sending the stream checkpoint message down the stream. Because each module in the set of modules 502-506 acts on the contents of the stream, each module receives the stream checkpoint message. When a module, such as module 506, receives a stream checkpoint message, the module responds by gathering information needed to restore the current state of the module, and storing the information in data 528. Each module knows the information the module should gather for the checkpoint. For example, data 528 may contain requests 522-526 in queue, which may be requests which module 506 has received but not yet performed. Data 528 may also contain the name of each module in a set of modules, such as set of modules 426, and the order in which each module in the set of modules is pushed onto stream 516.

Data 528 is then stored in a stream checkpoint, such as stream checkpoint 530. Stream checkpoint 530 contains stream data from stream 516, and module data, such as data 528, from each module in set of modules 502-506. A stream checkpoint, such as stream checkpoint 530, is created for every stream moving from a departure server to an arrival server. Stream checkpoint 530 is part of the data stored in checkpoint 532. Checkpoint 532 is a checkpoint, such as checkpoint 334 in FIG. 3. If one or more modules on stream 516 are unmodified, and therefore do not recognize the stream checkpoint message, and the stream restart message, a stream checkpoint cannot be created.

In preparation for moving a software partition from a departure server to an arrival server, a checkpoint is created. The data in the checkpoint includes the data for each stream, and the data for each set of modules on each stream for the software partition on the departure server. The data in the checkpoint is used to restore each stream, and restore the set of modules on each stream for the software partition on the arrival server. At substantially the same time the checkpoint is created, each software process in the software partition is frozen. The software partition containing the frozen processes is moved from the departure server to the arrival server. The data in the checkpoint is used to restore each stream, and the frozen processes are restarted on the arrival server. To restore each stream on the arrival server, a restart stream message, and stream checkpoint 530 is sent for each stream. The restart stream message and stream, and stream checkpoint 530 recreate stream 516, set of modules 502-506 on the departure server.

Figure 6:
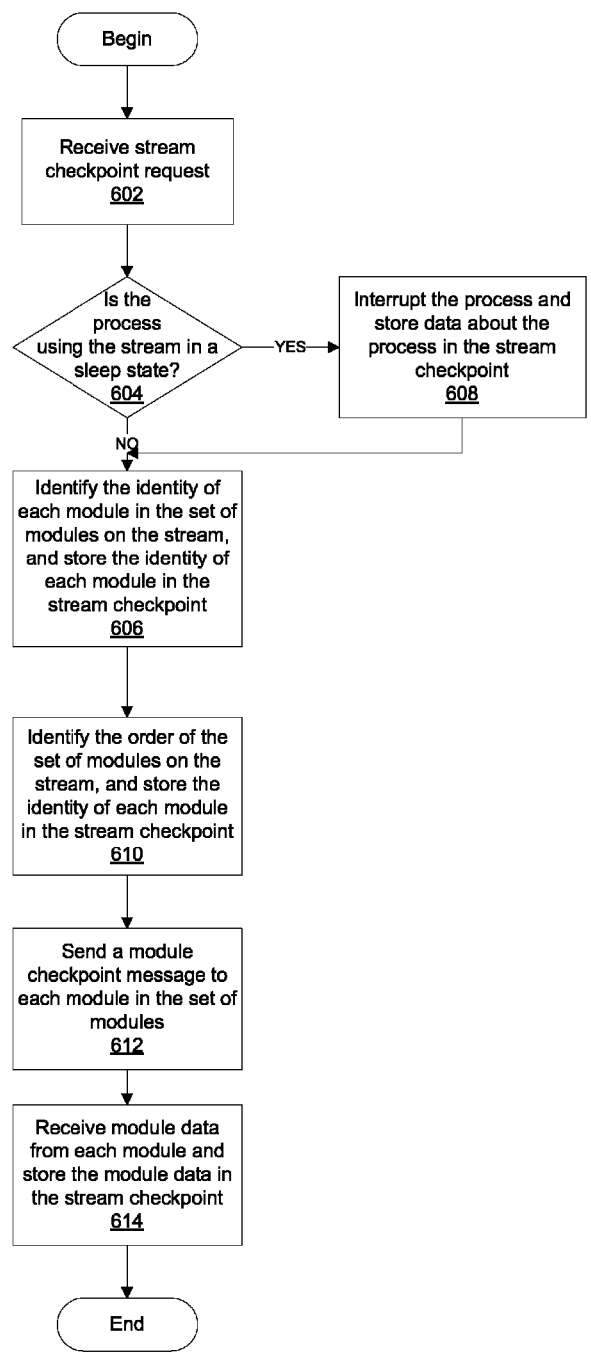
FIG. 6 is a flowchart of creating a stream checkpoint for the modules on the stream in accordance with an illustrative embodiment.

FIG. 6 is a flowchart of creating a stream checkpoint for the modules on the stream in accordance with an illustrative embodiment. The steps in FIG. 6 may be executed by a process, such as process 318 in FIG. 3. The process begins when a request to create a stream checkpoint is received (step 602). A determination is made whether the process using the stream is in a sleep state (step 604). If the answer to step 604 is "no", and the process using the stream is not in a sleep state, the identity of each module in the set of modules is identified and stored in the stream checkpoint (step 606). If the answer to step 604 is "yes", and the process using the stream is in a sleep state, the process is interrupted, and data about the interrupted process is stored in the stream checkpoint (step 608), and the process continues with step 606. The order of the set of modules is identified and stored in the stream checkpoint (step 610). Each module in the set of modules is sent a checkpoint message (step 612). Module data is received from each module in the set of modules, the module data is stored in the stream checkpoint (step 614), and the process ends.

Figure 7:
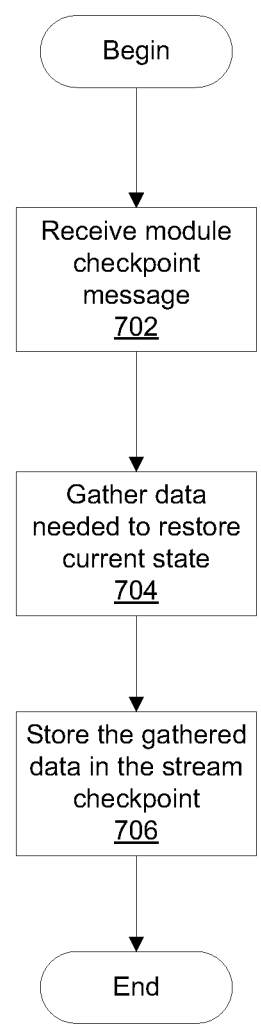
FIG. 7 is a flowchart of storing data from a module in accordance with an illustrative embodiment.

FIG. 7 is a flowchart of storing data from a module in accordance with an illustrative embodiment. The process in FIG. 7 is executed by a module, such as module 428 in FIG. 4. The process begins when the transport interface module receives a stream checkpoint message (step 702), such as the stream checkpoint message sent in step 612 in FIG. 6. Data needed to restore the current state of the module is gathered (step 704). The gathered data is stored in the stream checkpoint (step 706), and the process ends.

Figure 8:
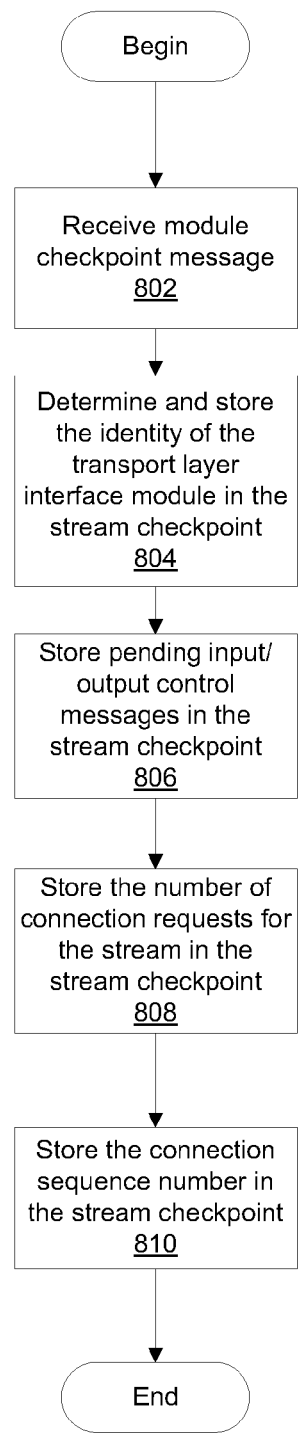
FIG. 8 is a flowchart of storing data from a transport interface module in accordance with an illustrative embodiment.

FIG. 8 is a flowchart of storing data from a transport interface module in accordance with an illustrative embodiment. The process in FIG. 8 is executed by a transport interface module, such as transport interface module 430 in FIG. 4. The process begins when the transport interface module receives a stream checkpoint message (step 802), such as the stream checkpoint message sent in step 612 in FIG. 6. The identity of the transport layer interface module is determined, and the identity of the transport layer interface module is stored in the stream checkpoint (step 804). Any pending input/output control (IOCTL) messages are stored in the stream checkpoint (step 806). A pending input/output control (IOCTL) message is a message received but not yet processed by the transport interface module when the checkpoint is created. The input/output control message changes the state of a connection. The input/output control message is a request on a queue in the transport interface module. The number of connection requests for the stream is stored in the stream checkpoint (step 808). When a process wishes to use a stream, the process sends a connection request. Thus, the number of connection requests indicates the number of processes using the stream. The connection sequence number used by transport interface module (TIMod) is stored in the stream checkpoint (step 810), and the process ends.

Figure 9:
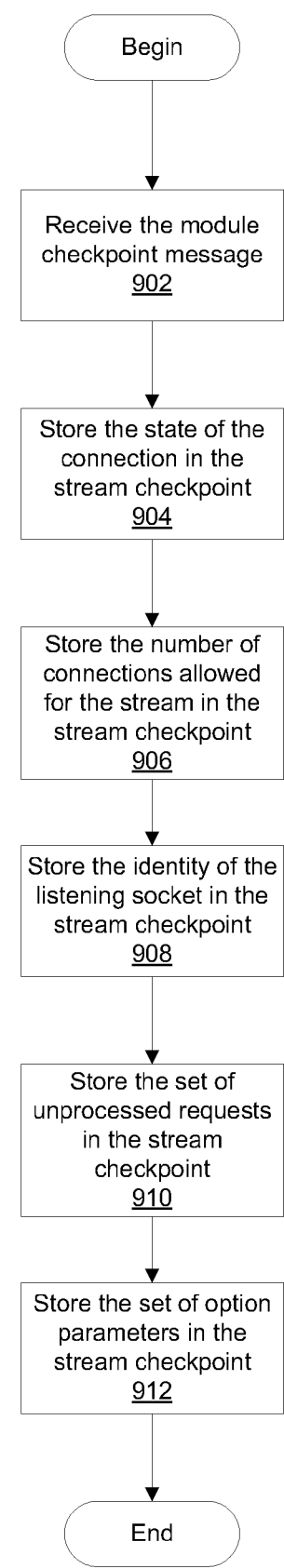
FIG. 9 is a flowchart of storing data from a transport layer interface module in accordance with an illustrative embodiment.

FIG. 9 is a flowchart of storing data from a transport layer interface module in accordance with an illustrative embodiment. The process in FIG. 9 is executed by a transport layer interface module, such as transport interface module 432 in FIG. 4. The process begins when the transport interface module receives a stream checkpoint message (step 902), such as the stream checkpoint message sent in step 612 in FIG. 6. The state of the connection is stored in the stream checkpoint (step 904). The state of the connection indicates the nature of the connection path which uses the stream. For example, the state of the connection may be open, closed, pending open, pending closed, open requested, or close requested. The number of connections allowed for the stream is stored in the stream checkpoint (step 906). The number of connections indicates the number of processes using the stream to establish a connection. The identity of the listening socket used by transport layer interface module is stored in the stream checkpoint (step 908). The identity of the listening socket is relevant when the stream is processing connection requests coming from the network. The set of unprocessed requests is stored in the stream checkpoint (step 910). The set of unprocessed requests are requests which the transport layer interface module has accepted but not yet performed. The set of option parameters are stored in the stream checkpoint (step 912), and the process ends. The set of option parameters include various options which can be set for the transport layer interface module.

Figure 10:
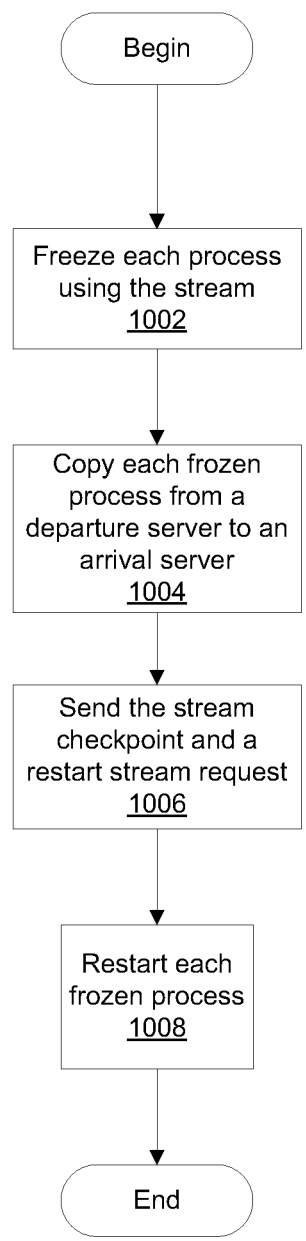
FIG. 10 is a flowchart of moving a partition from a departure server to an arrival server in accordance with an illustrative embodiment.

FIG. 10 is a flowchart of moving a partition from a departure server to an arrival server in accordance with an illustrative embodiment. The process in FIG. 10 is executed by a process, such as process 318 in FIG. 3. Each process using the stream is frozen (step 1002). Each frozen process is copied from a departure server to an arrival server (step 1004). The stream checkpoint, and a restart stream request is sent (step 1008). Each frozen process is restarted (step 1010), and the process ends.

Figure 11:
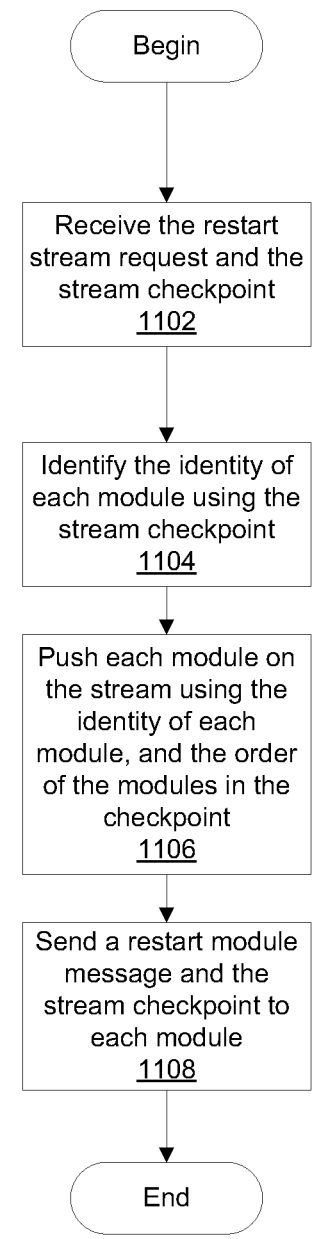
FIG. 11 is a flowchart of restoring a set of modules on a stream in accordance with an illustrative embodiment.

FIG. 11 is a flowchart of restoring a set of modules on a stream in accordance with an illustrative embodiment. The process in FIG. 11 is executed by a process, such as process 318 in FIG. 3. Both the restart stream request, and the stream checkpoint, are received (step 1102). The identity of each module using the stream checkpoint is identified (step 1104). Each module is pushed on the stream using the identity of each module, and the order of the modules in the checkpoint (step 1106). The stream checkpoint, and a restart module message is sent to each module (1108), and the process ends.

Figure 12:
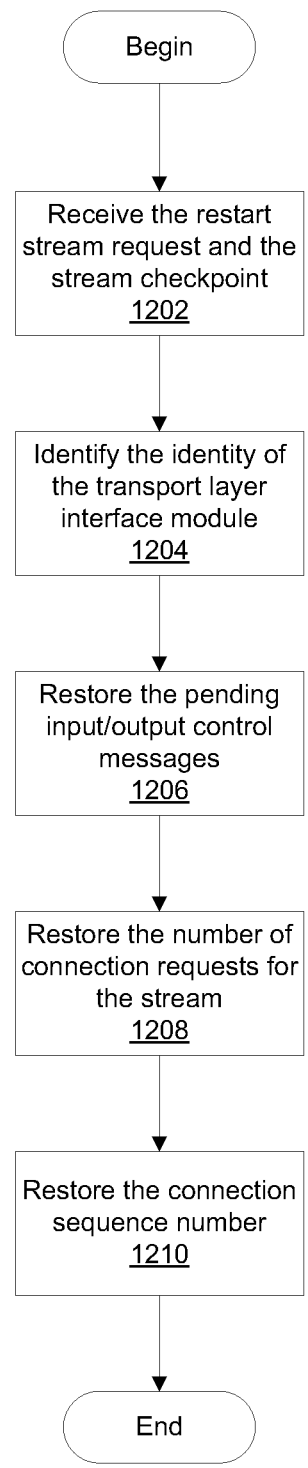
FIG. 12 is a flowchart of restoring data for a transport interface module in accordance with an illustrative embodiment.

FIG. 12 is a flowchart of restoring data for a transport interface module in accordance with an illustrative embodiment. The process in FIG. 12 is executed by a transport interface module, such as transport interface module 430 in FIG. 4. The process begins when the transport interface module receives a stream checkpoint, and a restart module message (step 1202), such as the stream checkpoint and stream restart message sent in step 1108 in FIG. 11. The identity of the transport layer interface module is identified (step 1204). The input/output control message is restored (step 1206). The number of connection requests for the stream is restored (step 1208). The connection sequence number is restored (step 1210), and the process ends.

Figure 13:
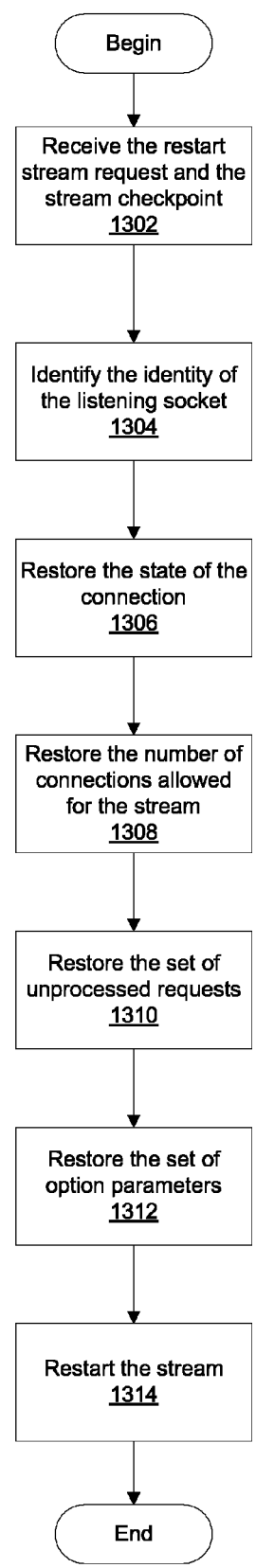
FIG. 13 is a flowchart of restoring data for a transport layer interface module in accordance with an illustrative embodiment.

FIG. 13 is a flowchart of restoring data for a transport layer interface module in accordance with an illustrative embodiment. The process in FIG. 12 is executed by a transport layer interface module, such as transport interface module 432 in FIG. 4. The process begins when the transport interface module receives a stream checkpoint, and a restart module message (step 1302), such as the stream checkpoint and stream restart message sent in step 1108 in FIG. 11. The identity of the listening socket is identified (step 1304). The state of the connection is restored (step 1306). The number of connections allowed for the stream is restored (step 1308). The set of unprocessed requests is restored (step 1310). The set of option parameters is restored (step 1312). The stream is restarted (step 1314), and the process ends.

Figure 14:
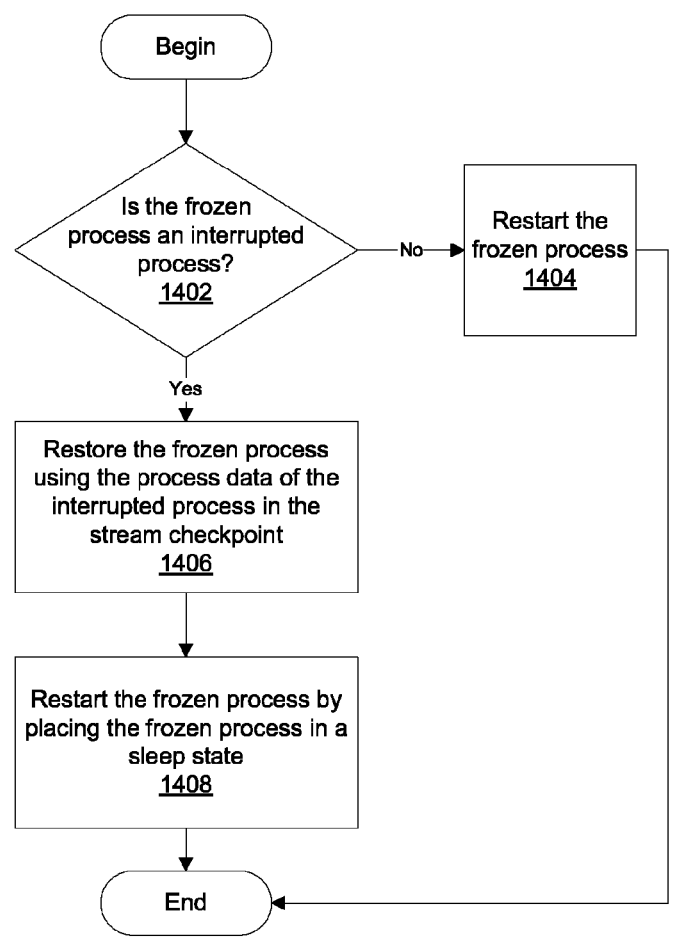
FIG. 14 is a flowchart of restarting a frozen process in accordance with an illustrative embodiment.

FIG. 14 is a flowchart of restarting a frozen process in accordance with an illustrative embodiment. The process in FIG. 11 is executed by a process, such as process 318 in FIG. 3. A determination is made as to whether the frozen process is an interrupted process (step 1402). If the answer in step 1402 is "yes", and the frozen process is an interrupted process, then the frozen process is restored using the process data of the interrupted process in the stream checkpoint (step 1404). The frozen process is restarted by placing the frozen process in a sleep state (step 1406), and the process ends. If the answer in step 1402 is "no", and the frozen process is not an interrupted process, then the frozen process is restarted (step 1408) and the process ends.

Thus, the illustrative embodiments described herein provide a computer implemented method, computer program product, and system for creating a checkpoint of a stream. A stream checkpoint request to create the checkpoint of the stream is received, wherein the stream is used by a process as a communications path, and wherein the communications path is modified by a set of modules. Responsive to identifying the identity of each module in the set of modules, the identity of each module in the set of modules is stored in the checkpoint. Responsive to identifying an order of the set of modules, the order of the set of modules is stored in the checkpoint. Responsive to sending a stream checkpoint message to each module in the set of modules, module data is received from each module in the set of modules to form received module data. The received module data is stored in the checkpoint.

The flowchart and block diagrams in the figures illustrate the architecture, functionality, and operation of some possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method comprising:
    responsive to a request to move a software partition from a departure server to an arrival server, freezing one or more processes of the software partition and freezing one or more communications of the one or more processes, wherein the one or more processes use a communication path for the one or more communications between the departure server and the arrival server;
    creating a set of checkpoint information for the software partition including state information for the one or more processes and state information for the one or more communications in the communication path;
    using the communication path to send the checkpoint information to the arrival server for resuming the one or more processes and the one or more communications in the arrival server;
    responsive to receiving a checkpoint request, creating, by a first processor on the departure server, a first checkpoint data in the set of checkpoints for a stream of the one or more communications, wherein the first checkpoint data checkpoint comprises state information for a set of processes executing on the departure server;
    responsive to receiving the checkpoint request, creating, by the first processor on the departure server, a second checkpoint data in the set of checkpoints for a set of modules used to send the stream to a transport layer, wherein the first checkpoint data and the second checkpoint data form the checkpoint, wherein the step of creating the second checkpoint data for the set of modules further comprises responsive to identifying an identity of each module in the set of modules, storing the identity of the each module in the set of modules in the second checkpoint data; responsive to identifying an order of the set of modules, storing the order of the set of modules in the second checkpoint data;
    responsive to sending a stream checkpoint message to the each module in the set of modules, receiving module data from the each module in the set of modules to form received module data;
    storing the received module data in the second checkpoint data;
    restarting, by a second processor on the arrival server, the stream after the first checkpoint and the second checkpoint have been created; and
    restarting, by the second processor on the arrival server, the set of modules after the first checkpoint and the second checkpoint have been created;
    wherein the communication path is to a transport layer in the departure server and the transport layer further communicates over a network with at least one other transport layer in the departure server.

2. The computer implemented method of claim 1, wherein the set of modules includes a transport interface module, and a transport layer interface module.

3. The computer implemented method of claim 1, wherein the step of creating a second checkpoint data for the set of modules further comprises:
    determining, by the first processor on the departure server, whether a process is in a sleep state; and
    upon a determination that the process is in the sleep state, interrupting, by the first processor on the departure server, the process to form an interrupted process, and storing a process data of the interrupted process in the second checkpoint data.

4. The computer implemented method of claim 3, further comprising:
    responsive to a transport layer interface module receiving the stream checkpoint message, receiving, by the first processor on the departure server, from the transport interface module an identity of the transport layer interface module, an input/output control message, a number of connection requests for the stream, and a connection sequence number, wherein the connection sequence number identifies a progress of the communication path; and
    storing, by the first processor on the departure server, the identity of the transport layer interface module, the input/output control message, the one or more processes using the stream, and the connection sequence number in the second checkpoint data.

5. The computer implemented method of claim 3, further comprising:
    responsive to a transport layer interface module receiving the stream checkpoint message, receiving, by the first processor on the departure server, from the transport layer interface module a state of a connection, a number of connections allowed for the stream, an identity of a listening socket, a set of unprocessed requests, and a set of option parameters; and
    storing, by the first processor on the departure server, the a state of the connection, the number of connections allowed for the stream, the identity of the listening socket, the set of unprocessed requests, and the set of option parameters in the second checkpoint data.

6. The computer implemented method of claim 5, wherein the transport layer interface module implements at least one of a transport layer interface protocol, and an extended transport interface protocol.

7. The computer implemented method of claim 1, further comprising:
    freezing, by the first processor on the departure server, a process to create a frozen process, wherein the frozen process is not executed;
    copying, by the first processor on the departure server, the frozen process from the departure server to the arrival server;
    sending, by the first processor on the departure server, a restart stream request and the first checkpoint data to restart the stream;
    sending, by the first processor on the departure server, the restart stream request and the second checkpoint data to restart the set of modules, wherein the checkpoint contains the received module data; and
    restarting, by the second processor on the arrival server, the frozen process to form a restarted process.

8. The computer implemented method of claim 7 further comprising:
- responsive to receiving the restart stream request, and the second checkpoint data, identifying, by the second processor on the arrival server, the identity of the each module in the set of modules;
- pushing, by the second processor on the arrival server, the each module in the set of modules on the stream using the identity of the each module, and using the order of the set of modules in the second checkpoint data, wherein pushing the each module on the stream allows the module to modify contents of the communication path;
- retrieving, by the second processor on the arrival server, the received module data from the second checkpoint data; and
- responsive to sending to the each module in the set of modules a restart module message and the received module data from the second checkpoint data, restoring, by the second processor on the arrival server, the state of the each module in the set of modules.

9. The computer implemented method of claim 8, further comprising:
- responsive to a transport layer interface module receiving the restart stream request and the second checkpoint data, identifying, by the second processor on the arrival server, the transport layer interface module using the second checkpoint data;
- restoring, by the second processor on the arrival server, an input/output control message using the second checkpoint data;
- restoring, by the second processor on the arrival server, a number of connection requests for the stream using the second checkpoint data; and
- restoring, by the processor, a connection sequence number using the second checkpoint data.

10. The computer implemented method of claim 8, further comprising:
- responsive to a transport layer interface module receiving the restart stream request and the second checkpoint data, identifying, by the second processor on the arrival server, the identity of the listening socket using the second checkpoint data;
- restoring, by the second processor on the arrival server, the state of a connection using the second checkpoint data;
- restoring, by the second processor on the arrival server, a number of connections allowed for the stream using the second checkpoint data;
- restoring, by the second processor on the arrival server, a set of unprocessed requests using the second checkpoint data; and
- restoring, by the second processor on the arrival server, a set of option parameters using the second checkpoint data.

11. The computer implemented method of claim 7, wherein the step of restarting the frozen process to form a restarted process further comprises:
- upon a determination that the frozen process is an interrupted process, restoring, by the second processor on the arrival server, the frozen process on the arrival server using a process data of the interrupted process in the second checkpoint data; and
- restarting, by the second processor on the arrival server, the frozen process by placing the frozen process in a sleep state.

12. A computer program product comprising:
- one or more non-transitory computer-readable mediums;
- computer usable program code, stored in at least one non-transitory computer-readable mediums, responsive to a request to move a software partition from a departure server to an arrival server, for freezing one or more processes of the software partition and freezing one or more communications of the one or more processes, wherein the one or more processes use a communication path for the one or more communications between the departure server and the arrival server;
- computer usable program code, stored in at least one of the non-transitory computer-readable mediums, for creating a set of checkpoint information for the software partition including state information for the one or more processes and state information for the one or more communications in the communication path;
- computer usable program code, stored in at least one of the non-transitory computer-readable mediums, for using the communication path to send the checkpoint information to the arrival server for resuming the one or more processes and the one or more communications in the arrival server;
- computer usable program code, stored in at least one the non-transitory computer-readable mediums, for creating a first checkpoint data in the first set of checkpoints for a stream of the one or more communications on a departure server in response to receiving a checkpoint request, wherein the first checkpoint data checkpoint comprises state information for a set of processes executing on the departure server;
- computer usable program code, stored in at least one of the non-transitory computer-readable mediums, for creating a second checkpoint data in the set of checkpoints on the departure server for a set of modules used to send the stream to a transport layer in response to receiving the checkpoint request, wherein the first checkpoint data and the second checkpoint data form the checkpoint, wherein the computer usable program code for creating the second checkpoint data for the set of modules further comprises responsive to identifying an identity of each module in the set of modules, computer usable program code for storing the identity of the each module in the set of modules in the second checkpoint data responsive to identifying an order of the set of modules, computer usable program code for storing the order of the set of modules in the second checkpoint data responsive to sending a stream checkpoint message to the each module in the set of modules, computer usable program code for receiving module data from the each module in the set of modules to form received module data storing the received module data in the second checkpoint data;
- computer usable program code, stored in the non-transitory computer-readable medium, for restarting the stream on the arrival server after the first checkpoint and the second checkpoint have been created; and
- computer usable program code, stored in at least one of the non-transitory computer-readable mediums, for restarting the set of modules on the arrival server after the first checkpoint and the second checkpoint have been created;
- wherein the communication path is to the transport layer in the departure server and the transport layer further communicates over a network with at least one other transport layer in the departure server.

13. The computer program product of claim 12, wherein the step of creating a second checkpoint data for the set of modules further comprises:

computer usable program code, stored in the non-transitory computer-readable medium, for determining whether a process on the departure server is in a sleep state; and computer usable program code, stored in the non-transitory computer-readable medium, for upon a determination that the process is in the sleep state, interrupting the process on the departure server to form an interrupted process, and storing a process data of the interrupted process in the second checkpoint data.

14. The computer program product of claim 13, further comprising:

computer usable program code, stored in at least one of the non-transitory computer-readable medium, for receiving, from the transport layer interface module on the departure server, an identity of a transport layer interface module, an input/output control message, a number of connection requests for the stream, and a connection sequence number in response to the transport interface module receiving the stream checkpoint message, wherein the connection sequence number identifies a progress of the communication path; and computer usable program cod, stored in at least one of the non-transitory computer-readable medium, for storing the identity of the transport layer interface module of the departure server, the input/output control message of the departure server, the one or more processes on the departure server using the stream, and the connection sequence number on the departure server in the second checkpoint data.

15. The computer program product of claim 13, further comprising:

computer usable program code, stored in at least one of the non-transitory computer-readable medium, for receiving from a transport layer interface module on the departure server a state of a connection, a number of connections allowed for the stream, an identity of a listening socket, a set of unprocessed requests, and a set of option parameters in response to the transport layer interface module receiving the stream checkpoint message; and computer usable program code, stored in at least one of the non-transitory computer-readable medium, for storing the a state of the connection of the departure server, the number of connections allowed for the stream of the departure server, the identity of the listening socket of the departure server, the set of unprocessed requests of the departure server, and the set of option parameters of the departure server in the second checkpoint data.

16. The computer program product of claim 15 further comprising:

computer usable program code, stored in at least one of the non-transitory computer-readable medium, for identifying on the arrival server the identity of the each module in the set of modules in response to receiving a restart stream request, and the second checkpoint data;

computer usable program code, stored in at least one of the non-transitory computer-readable medium, for pushing on the arrival server the each module in the set of modules on the stream using the identity of the each module, and using the order of the set of modules in the second checkpoint data, wherein pushing the each module on the stream allows the module to modify the contents of the communication path;

computer usable program code, stored in at least one of the non-transitory computer-readable medium, for retrieving on the arrival server the received module data from the second checkpoint data; and computer usable program code, stored in at least one of the non-transitory computer-readable medium, for restoring on the arrival server the state of the each module in the set of modules in response to sending, to the each module in the set of modules, a restart module message, and the received module data from the second checkpoint data.

17. The computer program product of claim 16, further comprising:

computer usable program code, stored in at least one of the non-transitory computer-readable medium, for identifying on the arrival server the transport layer interface module using the second checkpoint data in response to a transport interface module receiving the restart stream request and the second checkpoint data;

computer usable program code, stored in at least one of the non-transitory computer-readable medium, for restoring on the arrival server a input/output control message using the second checkpoint data;

computer usable program code, stored in the non-transitory computer-readable medium, for restoring on the arrival server a number of connection requests for the stream using the second checkpoint data; and computer usable program code, stored in at least one of the non-transitory computer-readable medium, for restoring on the arrival server a connection sequence number using the second checkpoint data.

18. The computer program product of claim 12, further comprising:

computer usable program code for freezing a process on the departure server to create a frozen process, wherein the frozen process is not executed;

computer usable program code for copying the frozen process from a departure server to the arrival server;

computer usable program code, stored in the non-transitory computer-readable medium, for sending from the departure server a restart stream request, and the first checkpoint data to restart the stream;

computer usable program code, stored in the non-transitory computer-readable medium, for sending from the departure server the restart stream request, and the second checkpoint data to restart the set of modules, wherein the checkpoint contains the received module data; and computer usable program code, stored in the non-transitory computer-readable medium, for restarting the frozen process on the arrival server to form a restarted process.

19. A data processing system comprising:

a departure server having one or more first processing units, one or more first non-transitory computer readable mediums and one or more first computer readable memories connected to a first bus;

a first communications unit connected to the first bus;

an arrival server having one or more second processing units, one or more second non-transitory computer readable mediums and one or more second computer readable memories connected to a second bus;

a second communications unit connected to the second bus; and computer usable program code, stored in the first non-transitory computer-readable medium for execution by at least one processing unit via at least one memory, responsive to a request to move a software partition from a departure server to an arrival server, for freezing one or more processes of the software partition and freezing one or more communications of the one or more processes, wherein the one or more processes use a communication path for the one or more communications between the departure server and the arrival server;

computer usable program code, stored in the first non-transitory computer-readable medium, for creating a set of checkpoint information for the software partition including state information for the one or more processes and state information for the one or more communications in the communication path;

computer usable program code, stored in the first non-transitory computer-readable medium, for using the communication path to send the checkpoint information to the arrival server for resuming the one or more processes and the one of more communications in the arrival server;

computer usable program code, stored in at least one of the first non-transitory computer-readable mediums for execution by at least one first processing unit via at least one first memory for creating a first checkpoint data in the set of checkpoints on a departure server for a stream of the one or more communications in response to receiving a checkpoint request, wherein the first checkpoint data checkpoint comprises state information for a set of processes executing on the departure server; create a second checkpoint data in the set of checkpoints on the departure server for a set of modules used to send the stream to a transport layer in response to receiving the checkpoint request for the stream, wherein the first checkpoint data and the second checkpoint data form the checkpoint, wherein creating the second checkpoint data for the set of modules further comprises responsive to identifying an identity of each module in the set of modules, storing the identity of the each module in the set of modules in the second checkpoint data responsive to identifying an order of the set of modules, storing the order of the set of modules in the second checkpoint data responsive to sending a stream checkpoint message to the each module in the set of modules, receiving module data from the each module in the set of modules to form received module data and storing the received module data in the second checkpoint data; and computer usable program code, stored in at least one of the second non-transitory computer-readable mediums for execution by at least one second processing unit via at least one second memory for restarting the stream on the arrival server after the first checkpoint and the second checkpoint have been created; and computer usable program code, stored in at least one of the second non-transitory computer-readable mediums for execution by at least one second processing unit via at least one second memory for restarting the set of modules on the arrival server after the first checkpoint and the second checkpoint have been created;

wherein the communication path is to the transport layer in the departure server and the transport layer further communicates over a network with at least one other transport layer in the departure server.

20. The data processing system of claim 19, further comprising:

computer usable program code, stored in at least one of the first non-transitory computer-readable mediums for execution by at least one first processing unit via at least one first memory for freezing a process on the departure server to create a frozen process, wherein the frozen process is not executed;

computer usable program code, stored in at least one of the first non-transitory computer-readable mediums for execution by at least one first processing unit via at least one first memory for copying the frozen process from the departure server to the arrival server;

computer usable program code, stored in at least one of the first non-transitory computer-readable mediums for execution by at least one first processing unit via at least one first memory for sending from the departure server a restart stream request, and the first checkpoint data to restart the stream;

computer usable program code, stored in at least one of the first non-transitory computer-readable mediums for execution by at least one first processing unit via at least one first memory for sending from the departure server the restart stream request, and the second checkpoint data to restart the set of modules, wherein the checkpoint contains the received module data; and computer usable program code, stored in at least one of the second non-transitory computer-readable mediums for execution by at least one second processing unit via at least one second memory for restarting the frozen process to form a restarted process.

* * * * *